(12) United States Patent
Deb et al.

(10) Patent No.: US 8,934,408 B2
(45) Date of Patent: Jan. 13, 2015

(54) SYSTEM AND METHOD FOR PROPORTIONAL RESOURCE ALLOCATION FOR MULTI-RATE RANDOM ACCESS

(75) Inventors: Supratim Deb, Karnataka (IN); Vikram Srinivasan, Karnataka (IN); Kanthi Nagaraj, Karnataka (IN); Piyush Gupta, Piscataway, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 934 days.

(21) Appl. No.: 12/962,926

(22) Filed: Dec. 8, 2010

(65) Prior Publication Data

US 2012/0147822 A1 Jun. 14, 2012

(51) Int. Cl.
*H04Q 7/20* (2006.01)
*H04W 74/08* (2009.01)
*H04W 74/00* (2009.01)

(52) U.S. Cl.
CPC ........ *H04W 74/085* (2013.01); *H04W 74/0833* (2013.01); *H04W 74/002* (2013.01); *H04W 74/0875* (2013.01)
USPC ........... 370/328; 370/329; 370/310; 370/343; 370/344; 455/434; 455/450

(58) Field of Classification Search
CPC . H04W 72/0486; H04W 72/04; H04W 72/08; H04W 72/1252; H04W 74/006; H04W 74/0833; H04W 74/08; H04W 74/008
USPC ......... 370/341, 431, 445, 447–449, 461, 462, 370/328–329, 310, 343, 344; 455/434, 450, 455/452.2, 464, 509
See application file for complete search history.

(56) References Cited

U.S. PATENT DOCUMENTS

| | | | | |
|---|---|---|---|---|
| 8,238,235 | B2 * | 8/2012 | Elaoud et al. | 370/230 |
| 8,259,687 | B2 * | 9/2012 | Foore et al. | 370/335 |
| 2001/0030948 | A1 * | 10/2001 | Tiedemann, Jr. | 370/305 |
| 2001/0034235 | A1 * | 10/2001 | Froula | 455/446 |
| 2005/0079865 | A1 * | 4/2005 | Ahn et al. | 455/434 |
| 2005/0152280 | A1 * | 7/2005 | Pollin et al. | 370/252 |
| 2006/0072502 | A1 * | 4/2006 | Crandall et al. | 370/329 |
| 2006/0268764 | A1 * | 11/2006 | Harris | 370/328 |
| 2008/0095102 | A1 * | 4/2008 | Meng et al. | 370/329 |
| 2009/0103501 | A1 * | 4/2009 | Farrag et al. | 370/337 |
| 2010/0135210 | A1 * | 6/2010 | Kim et al. | 370/328 |
| 2011/0292897 | A1 * | 12/2011 | Wu et al. | 370/329 |
| 2012/0218921 | A1 * | 8/2012 | Kim et al. | 370/280 |
| 2012/0225662 | A1 * | 9/2012 | Jo et al. | 455/447 |
| 2013/0182682 | A1 * | 7/2013 | Proctor et al. | 370/335 |

OTHER PUBLICATIONS

Albert Banchs et al: "Proportional fair throughput allocation in multirate IEEE 802.11 e wireless LANs", Wireless Networks; The Journal of Mobile Communication, Computation and Information, Kluwer Academic Publishers, DO, vol. 13, No. 5, Jun. 15, 2006, pp. 649-662, XP019535183, ISSN: 1572-8196.*

(Continued)

*Primary Examiner* — Wutchung Chu
(74) *Attorney, Agent, or Firm* — Harness, Dickey & Pierce (57) ABSTRACT

The present invention relates to a system and method for proportional-fair resource allocation for multi-rate random access. The method includes receiving, by a device, data packets to be transmitted to an access point on a shared uplink channel, and determining, by the device, whether or not to contend for access to the shared uplink channel based on a probability of access. The probability of access is based on a data transmission rate between the device and the access point.

14 Claims, 5 Drawing Sheets

(56) References Cited

OTHER PUBLICATIONS

Albert Banchs, "Proportional Fair throughout Allocation in Multirate IEEE 802.11e Wireless LANs," Wireless Networks, The Journal of Mobile Communication, Computation and Information, Kluwer Academic Publishers, vol. 13, No. 5, Jun. 15, 2006, pp. 649-662, XP019535183.

Krishnan Sundaresan et al., "Equivalence between Proportional Fairness and Time-based Fairness in Multi-rate Wireless LANs," INFOCOM IEEE Conference on Computer Communications Workshops, 2010, IEEE, Piscataway, New Jersey, Mar. 15, 2010, pp. 1-2, XP031677417.

International Search Report and Written Opinion dated Mar. 28, 2012.

* cited by examiner

SYSTEM AND METHOD FOR PROPORTIONAL RESOURCE ALLOCATION FOR MULTI-RATE RANDOM ACCESS

BACKGROUND

The wireless local area network (WLAN) standard, IEEE 802.11-2007, mandates supporting multiple modulation schemes with different forward error correction (FEC) schemes at the physical layer of a communication channel. Therefore, all devices implementing the IEEE 802.11-2007 standard support a fixed number of distinct modulation schemes. As a result, support a fixed number of different data rates. For example, the Orthogonal frequency-division multiplexing (OFDM) subsystem (IEEE 802.11a, g and n) provides a WLAN with data rates of 6, 9, 12, 18, 24, 36, 48 and 54 Mb/s. Of these, data rates 6, 12 and 24 Mb/s are mandatory.

However, the implementation of the above described standard results in unfair allocation of resources because client devices that can support higher data rates sometimes are forced to accept lower data rates. For example, the client devices that are far away from an access point usually fall back to communication at lower modulation schemes, as packets transmitted at lower modulation schemes can be demodulated without errors even if the packets are received at a lower signal strength. Packets sent at lower modulation schemes (e.g., lower data rates), take longer to reach the destination entity than packets transmitted using higher modulation schemes. According to the IEEE 802.11-2007 standard, by default, whenever a client device wants to transmit a data packet, the client device can transmit only one Media Access Control (MAC) layer packet when the client devices wins contention to the medium.

Therefore, all client devices of an access point generally receive equal opportunities to transmit data packets. The same is applicable to the downlink communication channel. This results in unfairness to client devices which can support higher data rates because the client devices that use lower modulation schemes occupy the channel for a long time when the lower-modulation client devices win contention to the medium. Therefore, the client devices that use higher modulation schemes do not receive data rates proportional to their channel conditions. As a result, far-away client devices bring down the performance of every node in the network. The following two examples further explain this problem.

In the first example, suppose there is a WLAN network with an access point "AP" and two clients C1 and C2. Both clients C1 and C2 are located close to the access point AP and support the highest modulation scheme resulting in data rates of 54 Mbps (highest in the 802.11g standard). If both of the clients C1 and C2 operate together, they both receive a data rate of approximately 54/2 Mbps. However, the throughput will probably be decreased because of overheads such as headers and acknowledgments (ACKs), and other physical layer complexities. Next, suppose that client C2 moves away from the access point AP and can support only the 6 Mbps data rate. Now, when clients C1 and C2 operate together, both get a data rate of approximately 6/2 Mbps even though client C1 has not changed its location. As a result, client C1's throughput decreased to approximately 4 Mbps because client C2's data packets take longer to reach the access point AP and both clients C1 and C2 share the medium on a packet-by-packet basis.

The second example relates to digital television (DVT) whitespace. For example, the Federal Communications Commission (FCC) has recently opened up unused TV spectrum in 50-698 MHz for unlicensed access of various kinds. This previously unused TV spectrum is referred to as DTV whitespace. Designing WLAN access technology over the DTV whitespace appears to be a promising use for the DTV whitespace spectrum. The WLAN networks that include such DTV whitespace spectrum will have much longer frequency ranges than the conventional WLAN network (2.4 GHz) because lower frequencies (e.g., 60-698 MHz) may propagate farther. Therefore, the problem of unfairness as shown in the first example will be exacerbated in a DTV whitespace WLAN network because the access points of this network will have longer ranges, and as a result, more client devices being further away from the access point. Therefore, this type of network has more chances of showing poor performance.

Conventional methods share the frequency spectrum by allocating frequency spectrum in a "max-min" fair manner (i.e., the data rate of the client which can achieve minimum data rate is maximized). However, this type of system decreases performance as a whole. A number of conventional approaches have been considered to improve performance, as described below.

The first conventional approach uses "client repeaters." For example, in this approach, high data rate client devices operate as repeaters for low data rate client devices. This mechanism is activated whenever the client devices (i.e., nodes) detect that it is beneficial to use this "repeater" mechanism as opposed to operating in the low data rate mode collectively. It also has been suggested to use network coding to alleviate re-transmission overheads of the repeater operation. However, this conventional approach depends on the presence of co-operating clients and involves the clients switching between operating modes (e.g., client mode to ad hoc mode) frequently. The mode-switching overheads make the implementation of this approach difficult in current hardware. Also, this conventional approach involves maintaining a table of mapping between signal strength to an expected data rate. However, signal strength based mapping to data rates may be inaccurate because this mapping does not completely account for packet losses. Also, this approach does not guarantee proportional fairness theoretically.

The second conventional approach uses an "idle sense." For example, in this approach, the contention windows of the contending hosts in a random access network are adjusted so that the contention widows converge to a value that is optimal for the network conditions. This approach addresses the rate unfairness issue when using time-fairness as the optimizing function. Although this mechanism ensures time-fairness, it does not ensure good channel utilization and may result in a waste of spectrum in the presence of only slow data rate clients because the optimal number of idle slots is calculated for a fixed bit rate.

The third conventional approach uses an opportunistic media access. For example, this approach allows clients that sense good channel conditions to transmit a burst of packets proportional to the data rate these clients are sensing. For example, this scheme allows a client sensing an 11 Mbps data rate to transmit five times more than a client sensing a 2 Mbps data rate. However, the main drawback of this approach is that the scheme relies on an RTS/CTS exchange between the stations to inform other stations in the network of ongoing communications. As a result, this approach is more suited to ad-hoc networks because in a typical infrastructure network, the RTS/CTS exchanges are usually turned off. Also, this approach may lead to unnecessary delays when several clients sensing very good channel conditions belong to the same network because the burst size is calculated with respect to the lowest data rate possible and not the lowest data rate among present clients.

The fourth conventional approach uses a time based fairness approach. This approach implements downlink queues at the access point and schedules packets for each client such that all clients get equal time-share. In the uplink channel, the protocol relies on being able to request clients to delay the transmission of a data packet till the access point schedules the transmission of the data packet. As a result, this approach requires setting up of as many queues at the access point as the number of clients. However, this implementation does not scale with the number of clients, and is dependant on measuring channel occupancy of each packet. Also, it is difficult to track this information at the access point for uplink traffic because of multi-rate retransmissions. Also, the implementation of this scheme for uplink is complicated because the access point must schedule every uplink packet in a centralized manner.

SUMMARY

The present invention relates to a system and method for proportional-fair resource allocation for multi-rate random access.

The method includes receiving, by a device, data packets to be transmitted to an access point on a shared uplink channel, and determining, by the device, whether or not to contend for access to the shared uplink channel based on a probability of access. The probability of access is based on a data transmission rate between the device and the access point.

The determining step may include receiving, by the device, an aggregate data transmission rate from the access point, calculating, by the device, the probability of access based on the received aggregate data transmission rate and the data transmission rate, and determining whether or not to contend for access to the shared uplink channel based on the calculated probability of access. The aggregate data transmission rate is a sum of data transmission rates for devices connected to the access point.

In one embodiment, the calculating step calculates the probability of access such that the probability of access increases as the data transmission rate increases and the probability of access decreases as the aggregate data transmission rate increases. Also, the receiving step may receive the aggregate data transmission rate when receiving an acknowledgement (ACK) packet.

The method may further include determining, by the device, whether the uplink shared channel is occupied, where the determining whether to contend for access step is performed if the uplink shared channel is determined as not occupied. Also, the method may further include waiting, by the device, a set period of time if the determining whether to contend for access step determines not to contend for access.

According to another embodiment, the method includes storing, by an access point, data packets in at least one queue among a plurality of queues, where each non-empty queue is associated with a probability of access to a shared downlink channel, and determining, by the access point, which stored data packets contend for access to the shared downlink channel based on the probability of access for each non-empty queue. The probability of access is based on a data transmission rate between a device and the access point.

The determining step may include calculating, by the access point, the probability of access for each queue based on an aggregate data transmission rate and a respective data transmission rate, determining, by the access point, whether each non-empty queue is eligible for contention based on the calculated probability of access for each respective non-empty queue, selecting, by the access point, one queue from at least one eligible non-empty queue, and determining, by the access point, the data packets in the selected queue as the data packets to contend for access. The aggregate data transmission rate is a sum of data transmission rates for devices connected to the access point.

The selecting step may randomly select one queue if two or more non-empty queues are determined as eligible. Also, the calculating step may calculate the probability of access such that the probability of access increases as the data transmission rate increases and the probability of access decreases as the aggregate data transmission rate increases. Each of the plurality of queues corresponds to a separate device connected to the access point.

According to another embodiment, the system includes a device configured to receive data packets to be transmitted to an access point on a shared uplink channel and configured to determine whether or not to contend for access to the shared uplink channel based on a probability of access. The probability of access is based on a data transmission rate between the device and the access point.

Further, the device is configured to receive an aggregate data transmission rate from the access point, configured to calculate the probability of access based on the received aggregate data transmission rate and the data transmission rate, where the device is configured to determine whether or not to contend for access to the shared uplink channel based on the calculated probability of access. The aggregate data transmission rate is a sum of data transmission rates for devices connected to the access point.

The device may be configured to calculate the probability of access such that the probability of access increases as the data transmission rate increases and the probability of access decreases as the aggregate data transmission rate increases.

Further, the device may be configured to determine whether the uplink shared channel is occupied, where the device is configured to determine whether to contend for access if the uplink shared channel is determined as not occupied. Also, the device may be configured to wait a set period of time if the device determines not to contend for access.

According to another embodiment, the system includes an access point configured to store data packets in at least one queue among a plurality of queues, where each non-empty queue is associated with a probability of access to a shared downlink channel, and the access point is configured to determine which stored data packets contend for access to the shared downlink channel based on the probability of access for each non-empty queue. The probability of access is based on a data transmission rate between a device and the access point.

Also, the access point may be configured to calculate the probability of access for each queue based on an aggregate data transmission rate and a respective data transmission rate, configured to determine whether each non-empty queue is eligible for contention based on the calculated probability of access for each respective non-empty queue, configured to select one queue from at least one eligible non-empty queue and determine the data packets in the selected queue as the data packets to contend for access. The aggregate data transmission rate is a sum of data transmission rates for devices connected to the access point.

Also, the access point may be configured to randomly select one queue if two or more non-empty queues are determined as eligible. Also, the access point may be configured to calculate the probability of access such that the probability of access increases as the data transmission rate increases and the probability of access decreases as the aggregate data transmission rate increases.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Various example embodiments of the present invention will now be described more fully with reference to the accompanying drawings in which some example embodiments of the invention are shown. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "acquiring" or "determining" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Embodiments of the present invention provide a system and method for proportional-fair allocation of resources for a network system. Proportional fair allocation of resources maximizes total system throughput while at the same time ensuring at least a minimum level of service to all devices connected to the network. Proportional fair allocation of a shared channel refers to client devices receiving access to the shared channel that is proportional to the highest modulation scheme that each respective client device can support. For example, a device connected to an access point determines whether or not to contend to access on the shared communication channel based on a probability of access to the shared channel, where the probability of access is substantially proportional to its data transmission rate to the access point.

Figure 1:
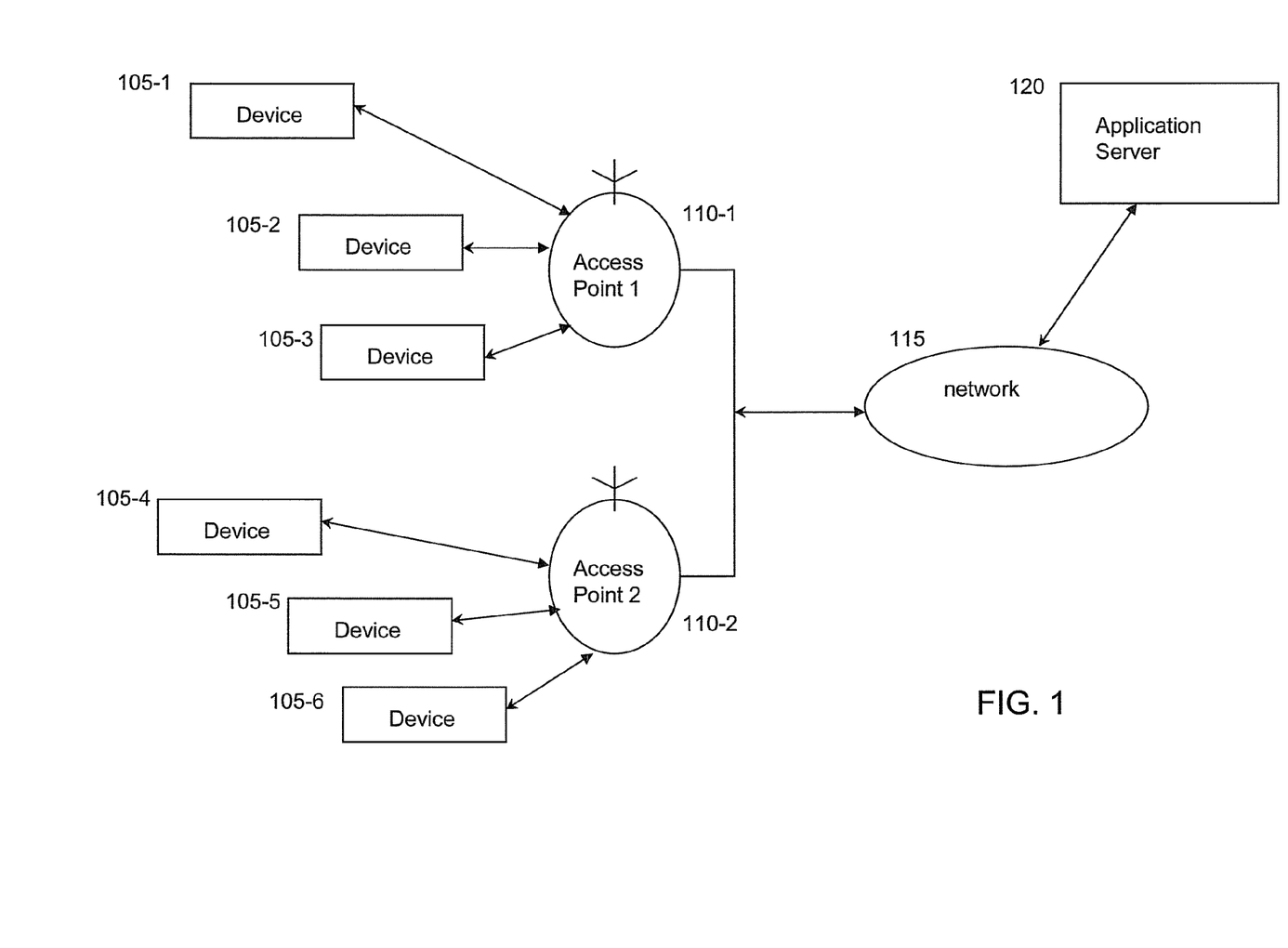
FIG. 1 illustrates a system for access to a shared channel in a network according to an embodiment of the present invention.

FIG. 1 illustrates a system for access to a shared channel in a network according to an embodiment of the present invention. The system includes a plurality of access points 110, and a plurality of devices 105 connected to each access point 110. Although FIG. 1 only illustrates a first access point 110-1 and a second access point 110-2, embodiments of the present invention encompass any number of access points 110 and any number of devices 105 connected to each access point 110. Each of the devices 105 may include a node that is configured to directly communicate with the access point 110. Each access point 110 may provide a connection to a network 115.

The network 115 may include any type of communication mechanism capable of conveying digitally encoded information. For example, the network 115 may include a telephony network such as a public switch telephone network (PSTN), a mobile telephone network, or a computer network such as a local area network or a wide area network, a cable network, a satellite network, and/or a broadcast network. Because the access points 110 are linked to the network 115, each device 105 may communicate with network devices such as an application server 120, for example. The application server 120 may be any type of server configured to receive, store, and transmit information over the network 115, for example.

Each device 105 may include any type of computing device configured to exchange data over the network 115 via the access point 110. For example, the devices 105 may include a communication station such as a notebook computer, a desktop computer, a personal data assistant, a tablet computer, a server, a mobile telephone, a portable gaming device, a hand held media station, a network-enabled radio, television, or other A/V components, a wearable-computing device, for example. Each device 105 may include a wireless transceiver such as a transceiver configured to operate in accordance with the IEEE 802.11-2007 standard (802.11).

The access points 110 function as centralized communication junctions for the devices 105. The access points 110 include at least one transceiver configured to transmit and receive data information (e.g., data packets) for a frequency range, or multiple frequency ranges. The frequency ranges may be defined by IEEE for the 802.11 family of wireless protocols. For example, the frequency range may include 2.4 GHz to 2.4835 GHz defined in 802.11b and 802.11g, or 5.15 GHz to 5.825 GHz defined for 802.11a. In addition, the frequency range may include the recently opened whitespace spectrum that includes the ranges of 50-698 MHz.

The frequency range or spectrum that the access points 110 operate within is referred to as a shared communication channel because all the devices connected to one access point share this frequency spectrum. For example, referring to FIG. 1, device 105-1, device 105-2 and device 105-3 share the communication channel that includes the set frequency range. If the device 105-1 transmits data packets to the access point 110-1, the communication channel is referred to as an uplink shared channel because the device 105-1 shares the frequency spectrum with devices 105-2 and 105-3, and the traffic flows from the device 105-1 to the access point 110-1. Similarly, on the downlink, if the access point 110-1 transmits data packets to the device 105-1, the communication channel is referred to as a downlink shared channel.

Each device 105 may operate according to a carrier sense multiple access (CSMA)/collision avoidance (CA) protocol, which is a probabilistic Media Access Control (MAC) protocol in which a device verifies the absence of other traffic before transmitting on a shared medium such as the shared communication channel discussed above. Each device 105 uses a MAC layer (e.g., CSMA/CA) in order to sense the absence of other traffic. For example, the device 105 attempts to detect the presence of an encoded signal from other devices 105 before attempting to transmit.

Each device 105 may be configured to operate according to the 802.11 standard, which supports multiple modulation schemes with different forward error correction (FEC) schemes. As such, each device 105 may be configured to operate according to a fixed number of different data rates. In an Orthogonal frequency-division multiplexing (OFDM) subsystem, the wireless local area network (WLAN) includes data communication rates/modulation schemes of 6, 9, 12, 18, 24, 36, 48 and 54 Mb/s. However, embodiments of the present invention encompass any type of WLAN standard with data communication rates/modulation schemes of any kind. In addition, the devices 105 may implement a rate adaptation algorithm. The rate adaptation algorithm enables the client/application to dynamically switch between modulation/FEC schemes with the objective of improving performance.

According to conventional 802.11 based CSMA, when a device 105 wants to transmit data packets, the device 105 senses whether the shared channel is occupied. If the device 105 senses that the shared channel is free (not occupied), the device 105 waits a contention period CW. The contention period CW is a random period after every transmit on every device 105, which statistically allows every device 105 equal access to the shared channel. At the end of the contention period CW, if the device 105 senses the channel to be free, the device 105 transmits over the shared channel at a data transmission rate, which has already been determined by the device 105. If this data transmission collides with an another data transmission, the contention period is repeated at 2 CW.

Embodiments of the present invention change the statistically equal access of the conventional 802.11 standard to proportionally fair access, which is based on each device's channel quality. In other words, proportional fairness gives access opportunities to devices 105 that are proportional to their channel quality. As such, proportional fairness is achieved if a probability of access $P_i$ (i being a particular device 105) is proportional to the device's data transmission rate $R_i$. In one embodiment, the value of the probability of access $P_i$ is dependent on the data transmission rate $R_i$ and an aggregate data rate $R_{total}$ (e.g., sum data rate of all devices connected to the access point 110), as further explained below.

Figure 2:
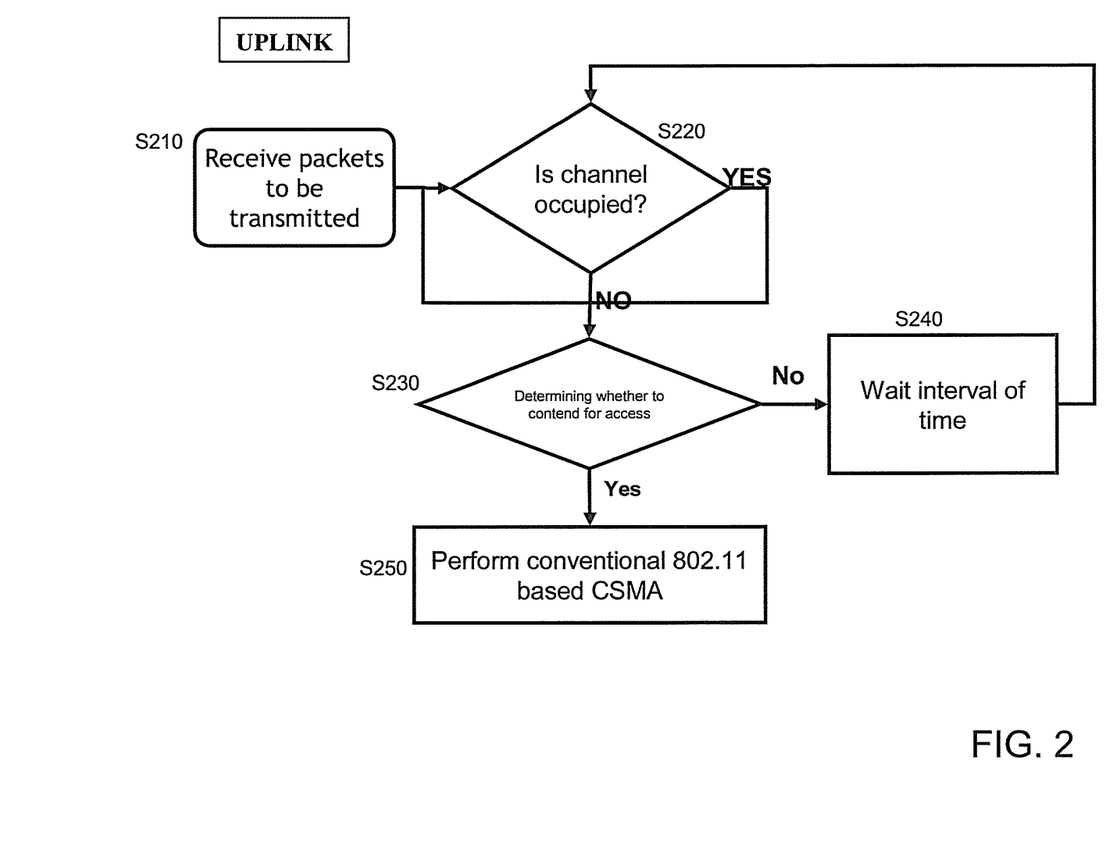
FIG. 2 illustrates a method for access to the shared uplink channel in the network according to an embodiment of the present invention.

FIG. 2 illustrates a method for access to a shared uplink channel in the network according to an embodiment of the present invention. In step S210, the device 105 receives data packets to be transmitted to its respective access point 110 on the shared uplink channel in its queue. Next, in step S220, the device 105 determines whether or not the channel is occupied. The device 105 makes this determination according to the CSMA/CA protocol. For example, the device 105 uses the MAC layer in order to sense the absence of other traffic. The device 105 attempts to detect the presence of an encoded signal from other devices 105 before attempting to transmit.

If the device 105 determines that the shared uplink channel is occupied (YES), the device 105 waits the contention period CW, and then makes this determination again. The device 105 repeats this process until the shared uplink channel is free.

If the device 105 senses that the shared uplink channel is not occupied (NO), in step S230, the device 105 determines whether or not to contend for access on the shared uplink channel based on the probability of access $P_i$ to the shared channel. The details of step S230, which includes how the probability of access $P_i$ is calculated, are further explained with reference to FIG. 3 of the present invention.

If the device 105 determines not to contend for access (NO), in step S240, the device 105 waits an interval of time to allow other devices 105 to contend for access. The interval of time may be the contention period CW, or any other fixed/variable period of time. After the device 105 waits the interval of time, the process returns to step S220. If the device 105 determines to contend for access based on its probability of access $P_1$, in step S250, the device 105 performs conventional 802.11 based CSMA for packet transmission, which has been previously described above. For example, after the device 105 determines to contend for access, the device 105 senses again whether the shared channel is occupied. If the device 105 senses that the shared channel is free (not occupied), the device 105 waits the contention period CW. At the end of the contention period CW, if the device 105 senses, yet again, the channel to be free, the device 105 transmits over the shared channel at its data transmission rate R.

Figure 3:
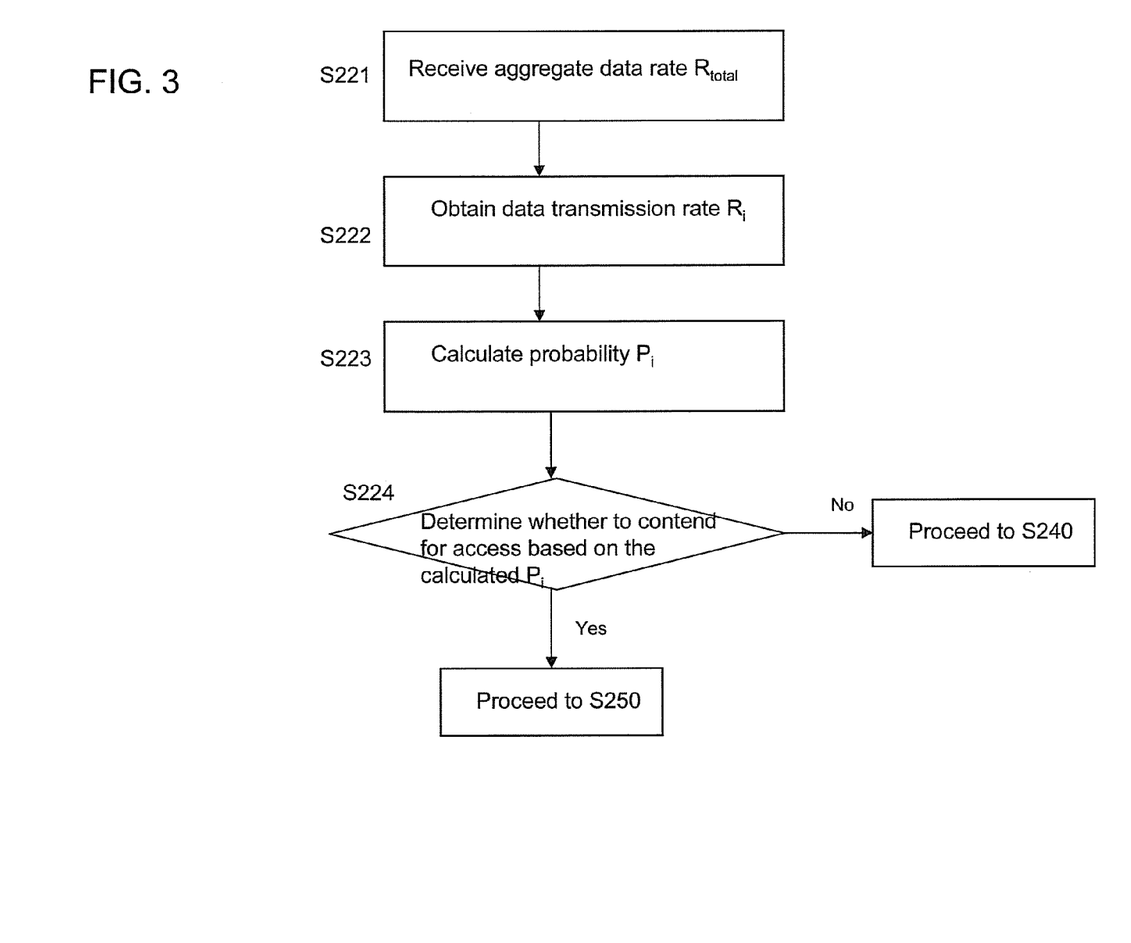
FIG. 3 illustrates a method for determining whether to contend for access to the shared uplink channel according to an embodiment of the present invention.

FIG. 3 illustrates a method for determining whether to contend for access to the shared uplink channel according to an embodiment of the present invention.

In step S221, the device 105 receives an aggregate data rate $R_{total}$ from the access point 110. The aggregate data rate $R_{total}$ is a sum of data transmission rates for the devices 105 connected to the access point 110. For instance, referring to FIG. 1, the aggregate data rate $R_{total}$ for the first access point 110-1 is the sum of the data transmission rates for device 105-1, the device 105-2 and the device 105-3. Because the data transmission rates of the devices 105 connected to a particular access point is known to that access point, the access point 110 calculates the aggregate data rate $R_{total}$, and transmits this information to the devices 105. The access point 110 may transmit the aggregate data rate $R_{total}$ to the devices 105 in a variety of different ways. In one particular example, the access point 110 may transmit the aggregate data rate $R_{total}$ when transmitting acknowledgment (ACK) packets to the devices 105. In another example, the access point 110 may periodically transmit beacon messages including the aggregate data rate $R_{total}$ to the devices 105.

In step S222, the device 105 obtains its data transmission rate $R_i$, which has been previously determined. For example, the device 105 may determine the data transmission rate $R_i$ based on the strength of the signal from the access point 110 and/or a number of retransmissions required for successful transmission at a particular transmission modulation/rate, or any other indicator of the probability of successful reception of a packet at the access point 110 sent at a given modulation/rate.

The device 105 calculates the probability of access $P_i$ based on the received aggregate data rate $R_{total}$ and the obtained data transmission rate $R_i$. For example, the device 105 calculates the probability of access $P_i$ such that (1) $P_i$ increases with the data transmission rate $R_i$ (e.g., the access probabilities increase as the transmission rate of the device increases), (2) $P_i$ decreases with aggregate data rate $R_{total}$ (e.g., the access probability of a given device decreases with the increase in the total rate of all other devices), and (3) $P_i$ increases as the probability that the shared channel is occupied by at least one contending device in sub-slots of the contention period CW.

In one particular example, the device 105 computes the probability of access according to the following equation:

$$Pi = \frac{2CW}{1+CW} \frac{\frac{Ri}{Rtotal}}{\left(1+\frac{Ri}{Rtotal}\right)}$$ Equation 1

$P_i$ is the probability of access to the shared uplink channel, CW is the contention period, $R_i$ is the data transmission rate of the device 105, and $R_{total}$ is the aggregate data rate. The value of CW is a set parameter. However, as discussed above, if the data transmission collides with another data transmission, the contention period is repeated at 2 CW. Therefore, the value of CW vanes based on a number of collisions.

In step S224, the device 105 determines whether to contend for access on the shared uplink channel based on the calculated probability of access $P_i$. To make this determination, the device 105 may use a random access protocol with weighted proportional fairness. For example, the random access protocol without weighted proportional fairness may generate a value of "0" or a value of "1", where a value of "1" is generated 50% of time. The value of "0" may represent that the device 105 does not contend for access, and the value of "1" may represent that the device 105 does contend for access. However, in a weighted random access protocol, the percentage of generating a value of "1" is set according to the calculated probability of access $P_i$. For example, the weighted random access protocol generates a value of "1" according to the calculated percentage (probability) of access $P_i$. Therefore, if the device 105 receives the value of "1", the device 105 determines to contend for access on the shared uplink channel, and the process goes to step S250 in FIG. 2 (YES). If the device 105 receives the value of "0", the device 105 determines not to contend for access on the shared uplink channel, and the process goes to step S240 in FIG. 2 (NO). The values of "0" and "1" are used for explanatory purposes only, where embodiments of the present invention encompass any type of weighted random protocol.

Downlink traffic flow operates in a similar manner. However, the access point 110 maintains a plurality of queues in which the access point 110 buffers the downlink data packets for the devices 105. A number of queues may correspond to a number of devices 105 connected to the access point 110. In other words, each of the plurality of queues is associated with a different device 105. Therefore, the access point 110 stores downlink data packets in device-specific queues. The queues may be first-in-first-out (FIFO) type queues. Also, each non-empty queue may be associated with a probability of access $P_m$ (m being the data packets in a specific queue). The access point 110 determines which stored data packets contend for access based on the probability of access $P_m$ for each queue. This is further explained below with reference to FIGS. 4-5 of the present invention.

Figure 4:
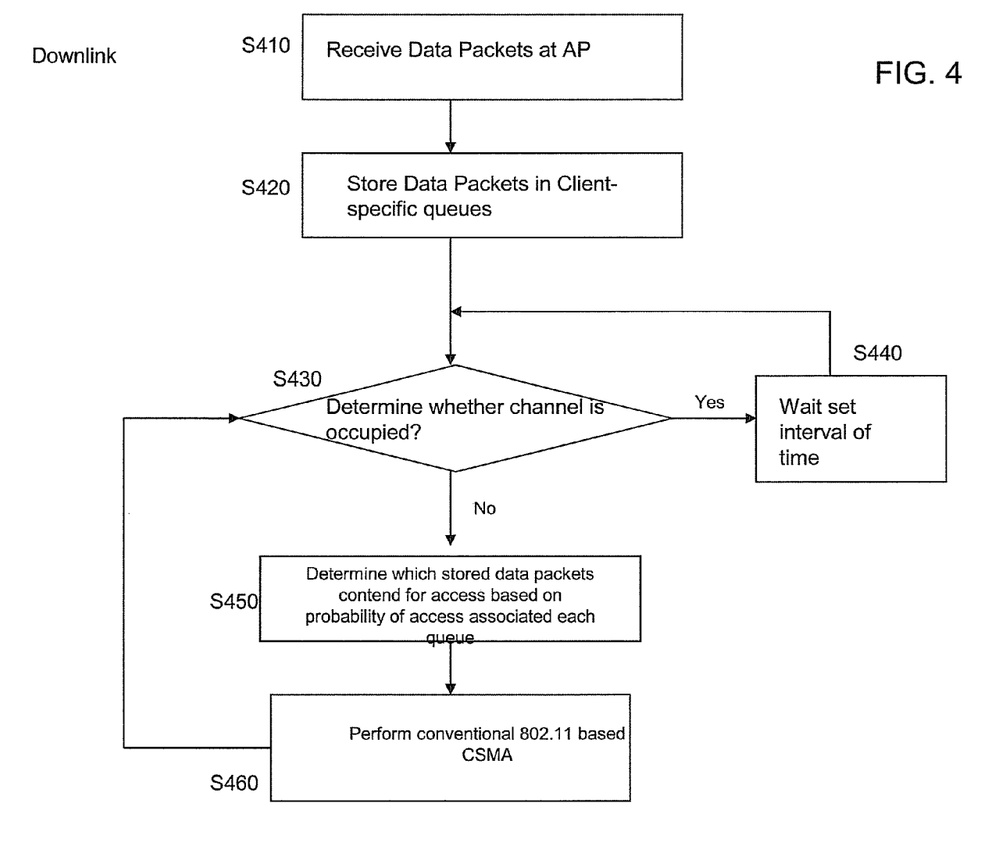
FIG. 4 illustrates a method for access to a shared downlink channel in the network according to an embodiment of the present invention.

FIG. 4 illustrates a method for access to a shared downlink channel in the network according to an embodiment of the present invention.

In step S410, the access point 110 receives downlink data packets from the network 115. In step S420, the access point 110 stores the data packets in the client-specific queues. For example, referring to FIG. 1, if the first access point 110-1 receives data packets for device 105-1, the first access point 110-1 stores the data packets in the specific queue for device 105-1.

In step S430, the access point 110 determines whether or not the channel is occupied. Similar to the uplink, the access point 110 makes this determination according to the CSMA/CA protocol. For example, the access point 110 uses the MAC layer in order to sense the absence of other traffic. If the access point 110 determines that the shared downlink channel is occupied (YES), in step S440, the access point 110 waits an interval of time, then makes this determination again. The interval of time may be the contention period CW or any other type of fixed/variable period. The access point 110 repeats this process until the shared downlink channel is idle.

If the access point 110 senses that the shared downlink channel is not occupied (NO), in step S450, the access point 110 determines which stored data packets contend for access based on the probability of access $P_m$ associated with each non-empty queue. Step S450 is further explained with reference to FIG. 5 of the present invention. After the access point 110 determines which data packets contend for access, the access point 110 performs conventional 802.11 based CSMA for packet transmission, which has been previously described above.

Figure 5:
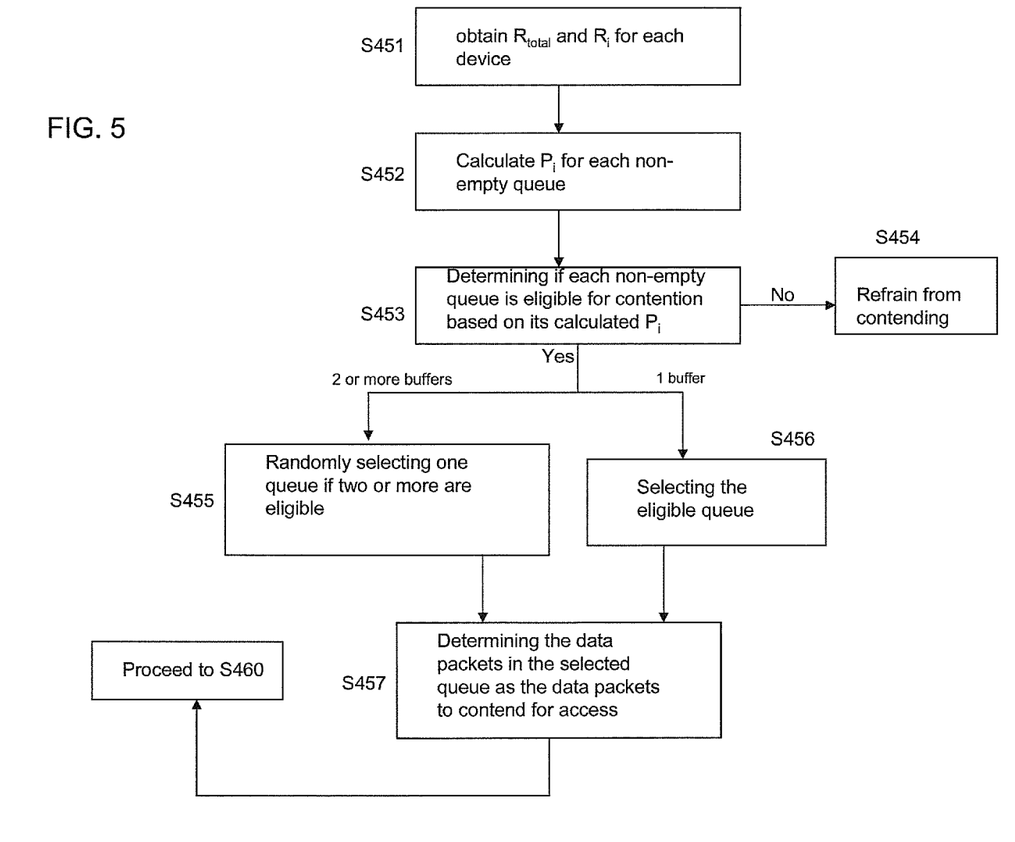
FIG. 5 illustrates a method for determining which data packets contend for access on a shared downlink channel according to an embodiment of the present invention.

FIG. 5 illustrates a method for determining which data packets contend for access on a shared downlink channel according to an embodiment of the present invention.

In step S451, the access point 110 obtains the aggregate data rate $R_{total}$, and the data transmission rate $R_i$ for each device 105 that has data packets stored in their queues at the access point 110. The access point 110 may obtain the data transmission rate $R_i$ of each device 105 that is connected to the access point 110 according to any conventional means. Also, as indicated above, the aggregate data rate $R_{total}$ is a sum of data transmission rates for the devices 105 connected to the access point 110. Because the data transmission rates of the devices 105 connected to a particular access point is known to that access point, the access point 110 may calculate the aggregate data rate $R_{total}$.

In step S452, the access point 110 calculates the probability of access $P_m$ for each non-empty queue based on the aggregate data rate $R_{total}$ and the data transmission rate $R_i$ of a respective device. The access point 110 calculates the probability of access $P_m$ for the queue in the same manner as the device 105 calculates the probability of access $P_i$. For example, the access point 110 calculates the probability of access $P_m$ such that (1) $P_m$ increases with the data transmission rate $R_i$ (e.g., the access probabilities increase as the transmission rate of the device increases), (2) $P_m$ decreases with aggregate data rate $R_{total}$ (e.g., the access probability of a given device decreases with the increase in the total rate of all other devices), and (3) $P_m$ increases as the probability that the shared channel is occupied by at least one contending device in sub-slots of the contention period CW. Also, the access point 110 may use Equation 1, as explained above, to calculate the access probability $P_m$.

In step S453, the access point 110 determines if each non-empty queue is eligible for contention based on its respective calculated probability of access $P_m$. For example, the access point 110 may use the weighed random access protocol, as explained above. For example, the weighted random access protocol generates a value of "1" according to the calculated percentage (probability) of access $P_m$. Therefore, a queue is determined as eligible if the weighted random access protocol generates a value of "1." Otherwise, the queue is determined as not eligible. The value of "1" is used for explanatory purposes only, where any other type of parameter (or parameters) may be used to determine the weighted random access. The access point 110 makes this determines for each of the queues that are non-empty. If the access point 110 determines that none of the queues are eligible for contention, in step S454, the access point 110 refrains from contending.

If the access point 110 determines that there are two or more queues eligible for contention, in step S455, the access point 110 randomly selects one queue from among the eligible queues. If the access point determines that there is only one eligible queue, the access point 110 selects the only eligible queue. In step 457, the access point determines the data packets in the selected buffer as the data packets to contend for access, and the process continues to step S460 in FIG. 4 for conventional 802.11 based CSMA packet transmission.

Proportional fair allocation of resources maximizes total system throughput while ensuring at least a minimum level of service to all users. Proportional fair allocation of the spectrum means that each device receives access to the spectrum proportional to its data rate. Embodiments of the present invention also reduce the number of collisions as compared to a conventional CSMA network, and may not require significant modifications to the existing implementation of the IEEE 802.11-2007 standard.

Variations of the example embodiments of the present invention are not to be regarded as a departure from the spirit and scope of the example embodiments of the invention, and all such variations as would be apparent to one skilled in the art are intended to be included within the scope of this invention.

What is claimed:

1. A method for access to a shared channel in a network, the method comprising:
   receiving, by a device, data packets to be transmitted to an access point on a shared uplink channel; and
   determining, by the device, whether or not to contend for access to the shared uplink channel based on a probability of access, the probability of access being based on a data transmission rate between the device and the access point, the determining including,
   receiving, by the device, an aggregate data transmission rate from the access point, the aggregate data transmission rate being a sum of data transmission rates for devices connected to the access point,
   calculating, by the device, the probability of access based on the received aggregate data transmission rate and the data transmission rate such that the probability of access increases as the data transmission rate increases and the probability of access decreases as the aggregate data transmission rate increases, and
   choosing, by the device, to contend for access based on a generated value, a likelihood that the generated value will indicate to contend for access is weighted by the probability of access.

2. The method of claim 1, wherein the receiving step receives the aggregate data transmission rate when receiving an acknowledgement (ACK) packet.

3. The method of claim 1, further comprising:
   determining, by the device, whether the uplink shared channel is occupied;
   wherein the determining whether to contend for access step is performed if the uplink shared channel is determined as not occupied.

4. The method of claim 1, further comprising:
   waiting, by the device, a set period of time if the determining whether to contend for access step determines not to contend for access.

5. A method for access to a shared channel in a network, the method comprising:
   storing, by an access point, data packets in at least one queue among a plurality of queues, each non-empty queue being associated with a probability of access to a shared downlink channel; and
   determining, by the access point, which stored data packets contend for access to the shared downlink channel based on the probability of access for each non-empty queue, the probability of access being based on a data transmission rate between a device and the access point, the determining including,
   calculating, by the access point, the probability of access for each queue based on an aggregate data transmission rate and a respective data transmission rate, the aggregate data transmission rate being a sum of data transmission rates for devices connected to the access point;
   determining, by the access point, whether each non-empty queue is eligible for contention based on the calculated probability of access for each respective non-empty queue;
   selecting, by the access point, one queue from at least one eligible non-empty queue, the selecting including randomly selecting one queue if two or more non-empty queues are determined as eligible, the randomly selecting being based on a generated value where a likelihood that the generated value will indicate to contend for access is weighted by the probability of access; and
   determining, by the access point, the data packets in the selected queue as the data packets to contend for access.

6. The method of claim 5, wherein the calculating step calculates the probability of access such that the probability of access increases as the data transmission rate increases and the probability of access decreases as the aggregate data transmission rate increases.

7. The method of claim 5, wherein each of the plurality of queues corresponds to a separate device connected to the access point.

8. A system for access to a shared channel in a network, the system comprising:
- a device configured to receive data packets to be transmitted to an access point on a shared uplink channel; and
- the device configured to determine whether or not to contend for access to the shared uplink channel based on a probability of access, the probability of access being based on a data transmission rate between the device and the access point, in the determining, the device is configured to,
  - receive an aggregate data transmission rate from the access point, the aggregate data transmission rate being a sum of data transmission rates for devices connected to the access point,
  - calculate the probability of access based on the received aggregate data transmission rate and the data transmission rate such that the probability of access increases as the data transmission rate increases and the probability of access decreases as the aggregate data transmission rate increases, and
  - choose to contend for access based on a generated value, a likelihood that the generated value will indicate to contend for access is weighted by the probability of access.

9. The system of claim 8, wherein,
the device is further configured to determine whether the uplink shared channel is occupied; and
the device is configured to determine whether to contend for access if the uplink shared channel is determined as not occupied.

10. The system of claim 8, further comprising:
the device configured to wait a set period of time if the device determines not to contend for access.

11. A system for access to a shared channel in a network, the system comprising:
- an access point configured to store data packets in at least one queue among a plurality of queues, each non-empty queue being associated with a probability of access to a shared downlink channel; and
- the access point configured to determine which stored data packets contend for access to the shared downlink channel based on the probability of access for each non-empty queue, the probability of access being based on a data transmission rate between a device and the access point, in the determining, the access point is configured to,
  - calculate the probability of access for each queue based on an aggregate data transmission rate and a respective data transmission rate, the aggregate data transmission rate being a sum of data transmission rates for devices connected to the access point,
  - determine whether each non-empty queue is eligible for contention based on the calculated probability of access for each respective non-empty queue,
  - select one queue from at least one eligible non-empty queue, the selecting includes randomly selecting one queue if two or more non-empty queues are determined as eligible, the randomly selecting being based on a generated value where a likelihood that the generated value will indicate to contend for access is weighted by the probability of access, and
  - determine the data packets in the selected queue as the data packets to contend for access.

12. The system of claim 11, wherein,
the access point is configured to determine whether each non-empty queue is eligible for contention based on the calculated probability of access for each respective non-empty queue; and
the access point is configured to select one queue from at least one eligible non-empty queue and determine the data packets in the selected queue as the data packets to contend for access.

13. The system of claim 12, wherein the access point is configured to randomly select one queue if two or more non-empty queues are determined as eligible.

14. The system of claim 12, wherein the access point is configured to calculate the probability of access such that the probability of access increases as the data transmission rate increases and the probability of access decreases as the aggregate data transmission rate increases.

* * * * *